(12) United States Patent
Jackson et al.

(10) Patent No.: US 7,089,733 B1
(45) Date of Patent: Aug. 15, 2006

(54) HYDRAULIC CONTROL VALVE SYSTEM WITH ELECTRONIC LOAD SENSE CONTROL

(75) Inventors: Randall S. Jackson, Burlington, WI (US); Richard R. Clanton, Menomonee Falls, WI (US); Joseph L. Pfaff, Wauwatosa, WI (US)

(73) Assignee: HUSCO International, Inc., Waukesha, WI (US)

( * ) Notice: Subject to any disclaimer, the term of this patent is extended or adjusted under 35 U.S.C. 154(b) by 24 days.

(21) Appl. No.: 11/068,229

(22) Filed: Feb. 28, 2005

(51) Int. Cl.
*F15B 11/042* (2006.01)

(52) U.S. Cl. .......................... 60/422; 60/452

(58) Field of Classification Search ............... 60/422, 60/452
See application file for complete search history.

(56) References Cited

U.S. PATENT DOCUMENTS

| | | | | |
|---|---|---|---|---|
| 5,138,838 A | * | 8/1992 | Crosser | 60/452 |
| 5,571,226 A | * | 11/1996 | Kobayashi | 60/452 |
| 6,173,573 B1 | * | 1/2001 | Kamada | 60/422 |
| 6,269,635 B1 | * | 8/2001 | Zuehlke | 60/452 |
| 6,389,808 B1 | * | 5/2002 | Sakai | 60/452 |
| 6,560,962 B1 | * | 5/2003 | Sawada et al. | 60/452 |

* cited by examiner

Primary Examiner—Thomas E. Lazo
(74) Attorney, Agent, or Firm—George E. Haas; Quarles & Brady LLP

(57) ABSTRACT

An apparatus is provided which has sensors that detect pressure on opposite sides of a control valve which controls the flow of hydraulic fluid from a source to a hydraulic actuator. The sensors produce electrical signals indicating those pressures. In response to the sensor signals, a controller produces an output signal the operates a proportional control valve to thereby regulate pressure at a node of the hydraulic circuit. Several mechanisms are described that react to the pressure at the node by varying the pressure of the fluid being supplied to the main valve so that a controlled pressure level is achieved.

17 Claims, 2 Drawing Sheets

HYDRAULIC CONTROL VALVE SYSTEM WITH ELECTRONIC LOAD SENSE CONTROL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to hydraulic circuits that operate machinery; and more particularly to controlling the pressure of hydraulic fluid supplied to power actuators of that machinery.

2. Description of the Related Art

Construction machinery, such as backhoes, have working members which are driven by several hydraulic cylinder and piston assemblies. Each cylinder is divided into two internal chambers by the piston and selective application of hydraulic fluid under pressure to either of the chambers moves the piston in a corresponding direction.

Application of hydraulic fluid to the cylinder often is controlled by a spool valve, such as the one described in U.S. Pat. No. 5,579,642. In this type of valve, a manual operator lever is mechanically connected to a control spool which slides within a bore in a valve body. The pump and tank of the system are connected to ports in the valve body and the cylinder chambers are coupled to workports. Movement of the spool into various positions directs pressurized hydraulic fluid from the pump to one of the cylinder chambers and drains hydraulic fluid from the other cylinder chamber to the tank. By varying the size of orifices through which the fluid flows in the spool valve, the rate of flow into the cylinder chambers can be varied, thereby moving the piston at proportionally different speeds.

To facilitate control, pressure compensating systems have been designed to maintain an approximately constant pressure drop across the spool valve. Those previous systems included sense lines which transmitted the hydraulic pressure at the valve workports to a control input of a variable displacement hydraulic pump. Typically, the greatest of the workport pressures for several working members is selected by a chain of shuttle valves as the pressure to apply to the pump control input. The resulting self-adjustment of the pump output as the workport pressure fluctuates provides an approximately constant pressure drop across the valve orifices whose cross-sectional area is controlled by the machine operator. This facilitates control because, with the pressure drop held constant, the speed of movement of each working member is determined only by the cross-sectional area of the corresponding orifice. Hydraulic systems of this type are disclosed in U.S. Pat. Nos. 4,693,272 and 5,579,642.

There is a trend with respect to construction and agricultural equipment away from manually operated hydraulic valves toward electrically controlled solenoid valves. This change in technology facilitates computerized regulation of various machine functions. Electrical control of system simplifies the hydraulic plumbing as the control valves can be located near the cylinder and not in the operator cab. Thus only a common pair of pump and tank lines needs to be run to the hydraulic actuators throughout the machine. However, for pressure compensation, the load sense pressure lines still must be run among the valve assemblies and the pump. Therefore, it is desirable to achieve pressure compensation without extending load sense pressure lines throughout the machinery.

SUMMARY OF THE INVENTION

The present invention controls the hydraulic output pressure of a pump in response to system pressures that are electrically sensed.

A hydraulic system employs a control valve to regulate the flow of fluid from a source to a hydraulic actuator that is connected to a workport of the valve. An apparatus is provided for controlling the pressure of fluid supplied to the control valve. That apparatus comprises first and second pressure sensors which produce electric signals respectively indicating pressure at the workport and of the fluid supplied to the control valve. Several preferred embodiments of the apparatus includes a proportional control valve receives fluid from the source and controls the application of that fluid to a hydraulic circuit node in response to an electric signal applied to a control input.

A controller has inputs to which the electric signals from the first and second sensors are applied and responds to those signals by producing a pressure command. The preferred embodiment of the controller includes a feed forward branch and a feedback circuit. The feed forward branch processes the pressure command to produce a first output signal, and the feedback circuit responds to the pressure command and the second electric signal by producing a second output signal. The feedback circuit preferably incorporates a PID controller. The first and second output signals are summed into a combined output signal that is applied to the proportional control valve to manipulate the pressure at the hydraulic circuit node.

A mechanism responds to pressure at the hydraulic circuit node by varying the pressure of fluid supplied to the control valve.

DETAILED DESCRIPTION OF THE INVENTION

Figure 1:
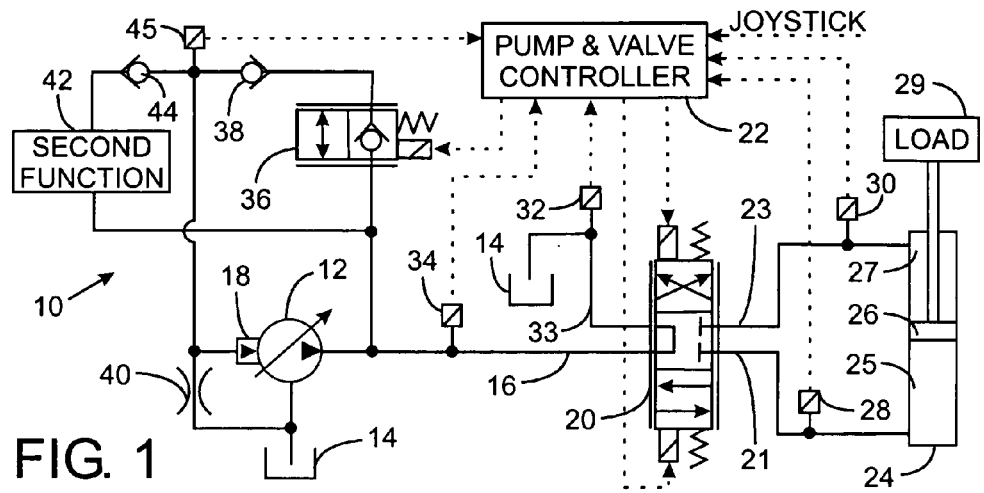
FIG. 1 is a schematic diagram of a hydraulic system according to the present invention which controls a variable displacement pump in response to sensed workport pressure.

With initial reference to FIG. 1, a hydraulic circuit 10 has a variable displacement pump 12 which draws hydraulic fluid from a tank 14 and furnishes the fluid under pressure to a supply line 16. The pressure at which the fluid is furnished to the supply line 16 is determined based on pressure applied at a control input 18 of the pump 12. Specifically, the pump is designed to produce an output pressure that is a given amount, known as the margin, greater than the pressure at the control input 18.

The supply line 16 is connected to a proportional, bidirectional load control valve 20 which is operated by a pair of solenoids. The load control valve 20 governs the flow of the pressurized fluid from supply line 16 to a hydraulic actuator, such as a cylinder 24 that has a piston 26 which divides the interior of the cylinder into two chambers 25 and 27. As used herein the term "hydraulic actuator" generically covers any device that converts hydraulic pressure into mechanical force, such as also including a hydraulic actuator. The piston is connected to a rod which in turn is mechanically coupled to the load 29 of a machine on which the hydraulic system is installed. In particular, the load control valve 20 has two workports 21 and 23 connected to a different one of the cylinder chambers 25 and 27. Depending upon the direction in which the load control valve 20 is moved, hydraulic fluid from the supply line 16 is applied through one of the workports to a chamber 25 or 27 of the cylinder 24. The other workport of the valve is connected to the tank 14 so that fluid can drain from the other cylinder chamber 27 or 25, respectively.

A separate pressure sensor 28 or 30 is connected to the workports 21 and 23 and provides an electrical signal indicative of the respective workport pressure.

A third pressure sensor 32 is located in the line 33 from the load control valve 20 to the tank 14 and produces an electrical signal that corresponds to the pressure in that line. A fourth pressure sensor 34 senses the pressure at the outlet of the pump 12.

The pressure indicating signals from the different sensors 28, 30, 32 and 34 are applied to a pump and valve controller 22. The pump and valve controller 22 includes a microcomputer that executes a control program which responds to these and other inputs signals and controls several valves within the hydraulic circuit 10, as will be described. For example, a output of the pump and valve controller 22 drives the solenoid of the load control valve 20.

Another output of the pump and valve controller 22 is connected to the solenoid of a proportional control valve 36 that has an input connected to the pump supply line 16. When the solenoid is activated, the proportional control valve 36 opens a path between the inlet and an outlet of the valve. In the non-activated state an internal check valve allows fluid to flow only from the outlet to the inlet when the outlet pressure is greater. The outlet of the proportional control valve 36 is connected by an external first check valve 38 to the control input 18 of the variable displacement pump 12. The control input 18 also is coupled through an orifice 40 the system tank 14.

The control input to the pump 12 may be connected to other functions on the machine, such as a second hydraulic system 42, which also are supplied with pressurized fluid from supply line 16. Each function is connected to the pump control input 18 by a separate check valve 38 or 44, so that the greatest pressure from those functions will be applied to the control input 18 of the variable displacement pump 12.

In the first embodiment of the present invention shown in FIG. 1, when the equipment operator enters a command to change the position of the load 29, as by manipulating a joystick, the electrical signal produced by that operation is conveyed to the pump and valve controller 22. That input signal provides an indication to the controller of the direction and the degree to which the load 29 is to be moved. The pump and valve controller 22 responds to this input signal by reading the pressure signal from sensor 28 or 30 which indicates the pressure of the workport 21 or 23 that needs to be powered in order to move the piston 26 in the desired direction. The pump and valve controller 22 also reads the input signal from pump supply line sensor 34 that indicates the pump output pressure.

If the supply line pressure is greater than the respective workport pressure, the pump and valve controller 22 sends a drive signal to move the load control valve 20 in the corresponding direction to properly power the cylinder 24.

On the other hand, if the pump supply pressure in line 16 is less than the associated workport pressure, the proportional control valve 36 is opened to apply the pressure from the supply line 16 to the control input 18 of the pump 12. Because the output pressure from the pump 12 is always a fixed amount greater than the pressure at the control input 18, opening the proportional control valve 36 increases the pressure at the control input 18 which results in an increase the output pressure of the pump. The proportional control valve 36 is increasingly opened until the output pressure of the pump exceeds the pressure at the workport 21 or 23 connected to the side of the cylinder that is to be driven. When this occurs, the pump and valve controller 22 decreases the opening of the proportional control valve 36. The pressure at the control input 18 of the pump decreases as the pressure in the pump control input 18 bleeds through the orifice 40.

If the pressure in the supply line 16 again becomes less than the associated workport pressure, either because the workport pressure increases or the supply line pressure decreases due to a drop in the control input pressure, that pressure relationship will be detected by the pump and valve controller 22 in response to the sensor signals. Should that condition occur, the proportional control valve 36 will be increasingly opened again to increase the pressure in the supply line 16.

When the load 29 has been properly positioned, the operator of the machine releases the joystick, terminating the signal that is applied as an input to the pump and valve controller 22. That controller responds by de-energizing the solenoid for the load control valve 20 causing the springs of that valve to return it to the center-off position, as illustrated. Without a command to move the load 29, the pump and valve controller 22 no longer operates the proportional control valve 36 in response to the pressure signals from sensors 28, 30, and 34. Thus, the proportional control valve 36 remains in the closed position that is illustrated. At the same time, the pressure at the control input 18 of the pump 12 is relieved gradually to tank 14 through the bleed orifice 40 thereby reducing the output pressure of the pump. Any pressure remaining in the line between proportional control valve 36 and the first check valve 38 is relieved through the internal check valve of the proportional control valve.

Figure 2:
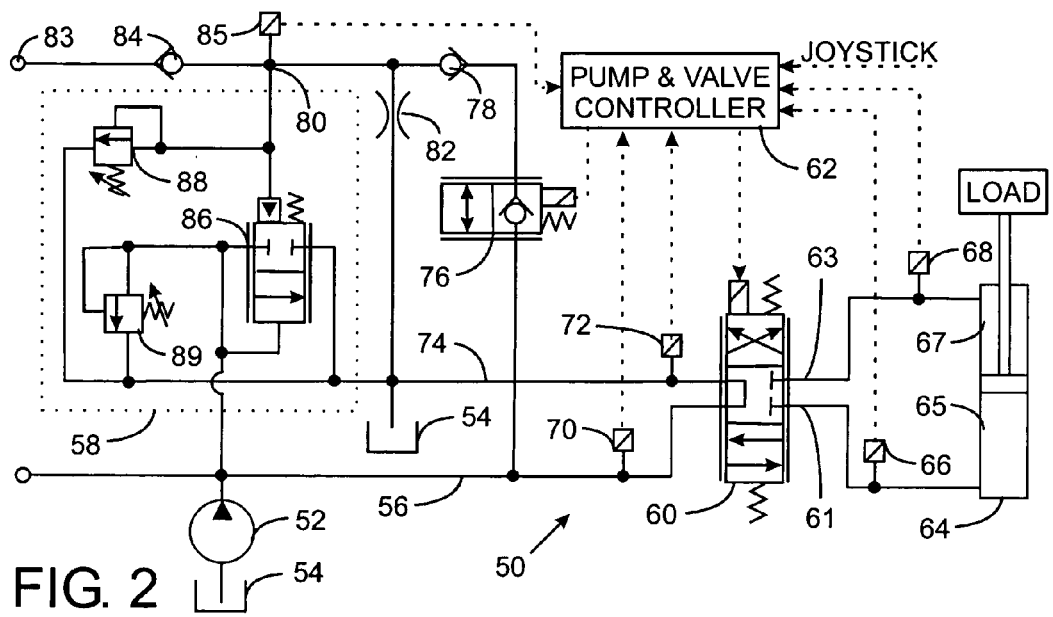
FIG. 2 is a schematic diagram of another embodiment of the present invention which includes a valve circuit that varies the supply pressure from a constant displacement pump in response to the sensed workport pressure.

FIG. 2 illustrates a hydraulic circuit 50 which incorporates a fixed displacement pump 52 which draws fluid from a tank 54 and applies it to a supply line 56. This hydraulic circuit incorporates an unloader mechanism 58 which, as will be described, regulates the pressure in the supply line 56 to achieve the same results as described above with respect to control of the variable displacement pump 12.

The supply line 56 feeds a proportional spool-type load control valve 60 which is operated by a solenoid that is activated by an electrical signal from a pump and valve controller 62. The load control valve 60 has another port that is connected to the tank 54, and a pair of workports 61 and 63 connected to different chambers 65 and 67 of a cylinder 64. A pair of pressure sensors 66 and 68 sense the pressure in each of the valve workports 61 and 63 and provide electrical signals indicative of that pressure to the pump and valve controller 62. Another pair of pressure sensors 70 and 72 produce electrical signals corresponding to pressures in the supply line 56 and the tank line 74, respectively.

The pump and valve controller 62 also operates a proportional control valve 76 which has an input connected to the pump supply line 56 and an output that is connected through a first check valve 78 to a node 80. The pressure at node 80 is detected by a sensor 85 that produces a load sense pressure signal that is applied to the pump and valve controller 62. The proportional control valve 76 is identical in construction to the proportional control valve 36 in FIG. 1. Node 80 is coupled through a bleed orifice 82 to the tank 54. The node 80 also can be connected to second function 83 through a second check valve 84, so that the pump output pressure in the common pump supply line 56 can be controlled in response to the needs of multiple functions.

The unloader mechanism 58 comprises a proportional unloader valve 86 which opens and closes in response to a differential between pressures acting on opposite sides of its spool. The pressure at node 80 is applied to one side of this unloader valve 86 and the other side is acted upon by the pump output pressure. When the pump output pressure is greater than the pressure at node 80 by a given amount determined by a valve spring, the proportional unloader valve 86 opens to relieve the excess pump pressure to tank. Pressure relief valves 88 and 89 are provided to relieve any excessively high pressure that occurs at node 80 or in the pump supply line 56, respectively.

The output pressure of the fixed displacement pump 52 can be relatively high in comparison to the typical pressure required at the workports 61 or 63. The unloader mechanism 58 ensures that the output pressure will be reduced to the proper operating pressure. Specifically, the pump and valve controller 62 operates as described previously with respect to the pump and valve controller 22 in FIG. 1. That is, the pump and valve controller compares the pressure in supply line 56, as indicated by pressure sensor 70, to the pressure of one of the workports 61 or 63, whichever is to be driven, as represented by the signal from sensor 66 or 68 respectively. When the workport pressure is greater than the pump supply line pressure, the pump and valve controller 62 increasingly opens the proportional control valve 76 to apply the supply line pressure to node 80. When the pump supply line pressure applied to one side of the unloader valve 86 is greater than the pressure at node 80 by a given margin as set by the valve spring, the unloader valve 86 opens to relieve some of the pump pressure to tank. When that pressure differential does not exist, i.e. the pressure in supply line 56 is less than the demand pressure at node 80 plus the spring force, the unloader valve 86 closes allowing the pressure in the supply line 56 to build-up due the high pressure at the output of pump 52. Thus, the unloader mechanism 58 functions in much the same way as a variable displacement pump control in ensuring that the pressure and supply line 56 will be at a sufficient level above the workport pressure to properly drive the cylinder 64.

The embodiments in FIGS. 1 and 2 utilize a shuttle arrangement of check valves 38 and 44, or 78 and 84, so that the greatest pressure among all of the functions being controlled used as the load sense pressure to control the variable displacement pump 12 or the unloader mechanism 58. Alternatively, the entire load sense function can be implemented electrically.

Figure 3:
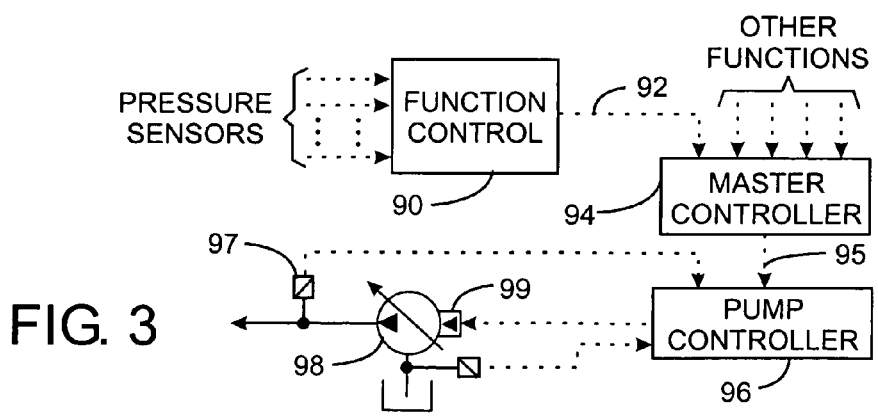
FIG. 3 is block diagram of an electronic circuit that controls a variable displacement pump by an electrical signal.

With reference to FIG. 3, the pressure sensors for workports for a particular function and the supply and tank lines are applied to a function control module 90 which operates the load control valve for that function. The function control module 90 evaluates the differential between the supply pressure and the workport pressure and responds by producing a signal on line 92 that designates the desired pressure required for proper operation of that function. This desired pressure signal is applied to a master controller 94 which also receives similar desired pressure signals from the other functions of the hydraulic system.

The master controller 94 evaluates the desired pressures from all the functions and determines a pressure command as an output signal 95 is applied to a pump controller 96. The pressure command signal 95 may simply correspond to the greatest desired pressure among all the functions, or it may be selected from one of the other desired pressures based on a predefined logic operation. For example, a particular function may have a higher priority than other functions. Thus when that function is sending a desired pressure, that input is used over other desired pressure signals in a particular system. The resultant pressure command signal 95 and the pump supply line pressure, as indicated by a sensor 97, are employed by the pump controller 96 to electrically operate a variable displacement pump 98.

Figure 4:
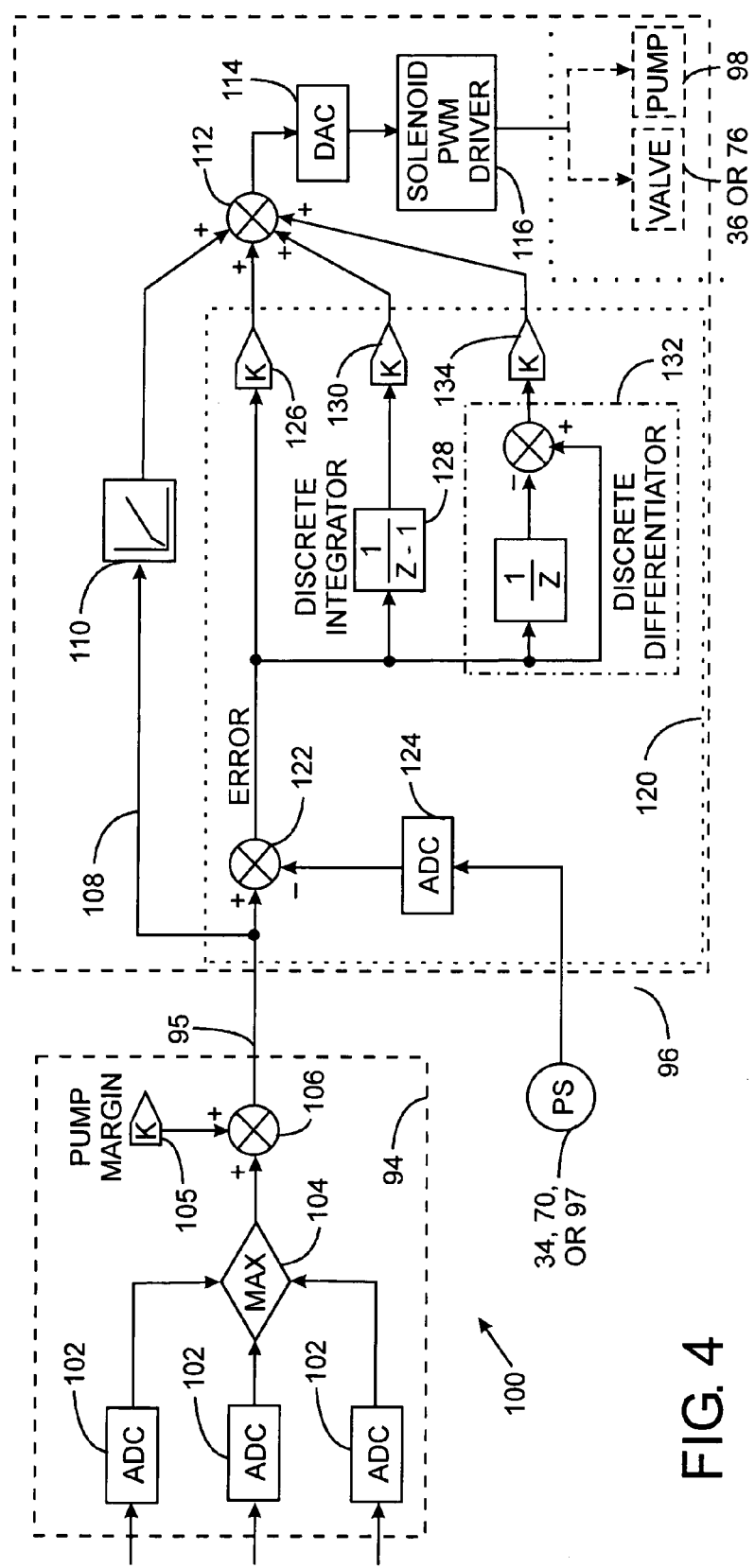
FIG. 4 depicts the control process employed to control the components in FIGS. 1–3.

With reference to FIG. 4, a generic electronic load sense algorithm for implementation by the controllers in FIGS. 1–3 comprises three main sections: determination of the pressure command, a feed forward control branch, and a feedback control loop. For simplicity, the algorithm will be described in the context of the control system depicted in FIG. 3. It should be understood that in the hydraulic system in FIGS. 1 and 2 the entire algorithm is performed by the single pump and valve controller 22 or 62, respectively.

The desired pressure signals on lines 92 from each function control module 90 on the machine are applied as inputs to the master controller 94. A separate analog-to-converter (ADC) digitizes each signal and applies it to a selection block 104. As noted previously, the master controller 94 merely may select the desired pressure input which is the highest. Alternatively, the selection block 104 may employ another logic function to determine the signals level to convey to a first summing node 106. The master controller 94 also stores a value 105 which corresponds to the desired pump margin. This value may be a fixed value or can be determined logically using an algorithm based on the desired pressure signals from the different function controls. The pump margin value 105 is applied to the summing node 106 where it is added to the selected desired pressure to produce a pressure command signal 95 of the master controller 94.

The remaining steps of the control algorithm are performed by the pump controller 96. The pressure command signal 95 is applied to a feed forward control branch 108 where it accesses a look-up table 110 stored within a memory of the pump controller 96. The look-up table 110 converts the pressure command into a solenoid drive current level for the control input 99 of the pump 98 in FIG. 3 (or for the proportional control valve 36 or 76 in FIG. 1 or 2).

The output value from the look-up table 110 is applied to a signal combiner, such as a second summing node 112, which produces combined value that is converted into an analog control signal by a digital to analog converter (DAC) 114. That analog control signal is applied to a solenoid pulse width modulation (PWM) driver 116 which produces the activation signal for operating either the pump 98 or a proportional control valve 36 or 76.

The pressure command signal 95 also is applied to a feedback loop which utilizes a conventional, proportional integral derivative (PID) controller 120. Specifically, the pressure command signal 95 is applied to a third summing node 122 which also receives a signal from the respective pump output pressure sensor 34, 70 or 97. In particular, the sensor signal is converted to a digital form by another analog to digital converter (ADC) 124 which applies the digital signal to an inverting input of the third summing node 122. The combination of the signals at the third summing node 122 produces an ERROR signal which represents the difference between the command pressure and the actual pressure produced by the hydraulic pump.

The ERROR signal is applied to the PID controller 120. Specifically, the ERROR signal is amplified by a proportional gain 126 in a first branch of the PID controller and the result is applied to another input of the second summing node 112. The ERROR signal also is operated on by a discrete integrator 128 and an integral gain 130 is applied to the result with the ultimate value being applied to the second summing node 112. A discrete differentiator 132 in the PID controller 120 processes the ERROR signal and a differential gain 134 is applied to the intermediate result with the produced value being applied to the second summing node 112. The closed loop output of the PID controller 120 is the sum of the ERROR, the integral of the ERROR, and the derivative of the ERROR, as multiplied by their respective gains. The specific value of those gains K are determined from the particular hydraulic system for which the algorithm is being used. It should be understood that the three separate signals could be combined into a single output signal within the PID controller 120 which then is applied to the second summing node 112.

One reason that previous attempts at electro-hydraulic systems for mobile equipment where found to be less than satisfactory was that the response of the control system was too slow under certain conditions. The present control algorithm 100 that employs both a feed forward and feedback loop combination provides an improved estimate of the commanded current needed to drive either the pump control input or the proportional control valve. As a consequence, the present control technique has a faster response than that provided by a feedback loop alone.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

What is claimed is:

1. In a hydraulic system having a control valve which controls flow of fluid from a source to a workport connected to a hydraulic actuator, an apparatus for controlling pressure of the fluid supplied to the control valve, wherein the apparatus comprises:

a first sensor producing a first electric signal indicating pressure at the workport;

a second sensor which produces a second electric signal indicating the pressure of fluid supplied to the control valve;

a hydraulic circuit node;

a proportional control valve having an inlet for receiving fluid from the source and an outlet connected to the hydraulic circuit node, wherein the proportional control valve is operated by an electric signal applied to a control input;

a controller connected to the first sensor and second sensor and having an output that is connected to the control input of the proportional control valve, wherein the controller operates the proportional control valve in response to the first electrical signal and the second electrical signal; and a mechanism which responds to pressure at the hydraulic circuit node by varying the pressure of fluid supplied to the control valve.

2. The hydraulic system as recited in claim 1 wherein the source includes a variable displacement pump which produces an output pressure in response to a pressure at a control signal input; and the mechanism comprises a fluid conduit connecting the hydraulic circuit node to the control signal input.

3. The hydraulic system as recited in claim 1 wherein the mechanism comprises unloader valve which responds to a pressure differential between the hydraulic circuit node and the pressure of fluid supplied to the control valve exceeding a predefined level by reducing the pressure of fluid supplied to the control valve.

4. The hydraulic system as recited in claim 1 further comprising an orifice connected between the hydraulic circuit node and a tank of the hydraulic system.

5. The hydraulic system as recited in claim 1 further comprising a check valve operably connected to permit fluid to flow only in a direction from the proportional control valve to the hydraulic circuit node.

6. The hydraulic system as recited in claim 1 wherein the controller responds to the first electric signal and the second electric signal by producing a pressure command, the controller having a feed forward branch which processes the pressure command to produce a first output signal and having a feedback controller which processes the pressure command and the second electrical signal and in response thereto produces a second output signal, and the controller having a combiner that combines the first output signal and second output signal to produce a combined output signal for controlling the mechanism.

7. The hydraulic system as recited in claim 6 wherein the controller comprises a source of a pump margin value and the pressure command also is produced in response to the pump margin value.

8. The hydraulic system as recited in claim 6 wherein the feedback controller comprises a PID controller.

9. In a hydraulic system having a control valve which controls flow of fluid from a source to a workport connected to a hydraulic actuator, an apparatus for controlling pressure of the fluid supplied to the control valve, wherein the apparatus comprises:

a first sensor which produces a first electric signal indicating pressure at the workport;

a second sensor which produces a second electric signal indicating the pressure of fluid supplied to the control valve;

a controller connected to the first sensor and to the second sensor and having a feed forward branch and a feedback circuit, the controller responds to the first electric signal and the second electric signal by producing a pressure command, the feed forward branch processes the pressure command to produce a first output signal, and the feedback circuit responds to the pressure command and to the second electric signal by producing a second output signal, the controller further having an element that combines the first output signal and the second output signal into a combined output signal; and a mechanism which responds to the combined output signal by varying the pressure of fluid supplied to the control valve.

10. The hydraulic system as recited in claim 9 wherein the feed forward branch comprises a look up table which converts the pressure command into the first output signal.

11. The hydraulic system as recited in claim 9 wherein the feedback circuit comprises a PID controller.

12. The hydraulic system as recited in claim 9 wherein the controller comprises a source of a pump margin value and the pressure command also is produced in response to the pump margin value.

13. The hydraulic system as recited in claim 9 further comprising a proportional control valve having an inlet for receiving fluid from the source and an outlet connected to a hydraulic circuit node, wherein the proportional control valve is operated by the combined output signal.

14. The hydraulic system as recited in claim 13 wherein the source includes a variable displacement pump which produces an output pressure in response to a pressure at a control signal input; and the mechanism comprises a fluid conduit connecting the hydraulic circuit node to the control signal input.

15. The hydraulic system as recited in claim 13 wherein the mechanism comprises unloader valve which responds to a pressure differential between the hydraulic circuit node and the pressure of fluid supplied to the control valve by reducing the pressure of fluid supplied to the control valve.

16. The hydraulic system as recited in claim 13 further comprising an orifice connected between the hydraulic circuit node and a tank of the hydraulic system.

17. The hydraulic system as recited in claim 13 further comprising a check valve operably connected to permit fluid to flow only in a direction from the proportional control valve to the hydraulic circuit node.

* * * * *